Oct. 14, 1930.  E. E. ELAM  1,778,629
SYSTEM OF FARMING AND TRAPPING MUSKRATS
Filed May 22, 1929   2 Sheets-Sheet 1
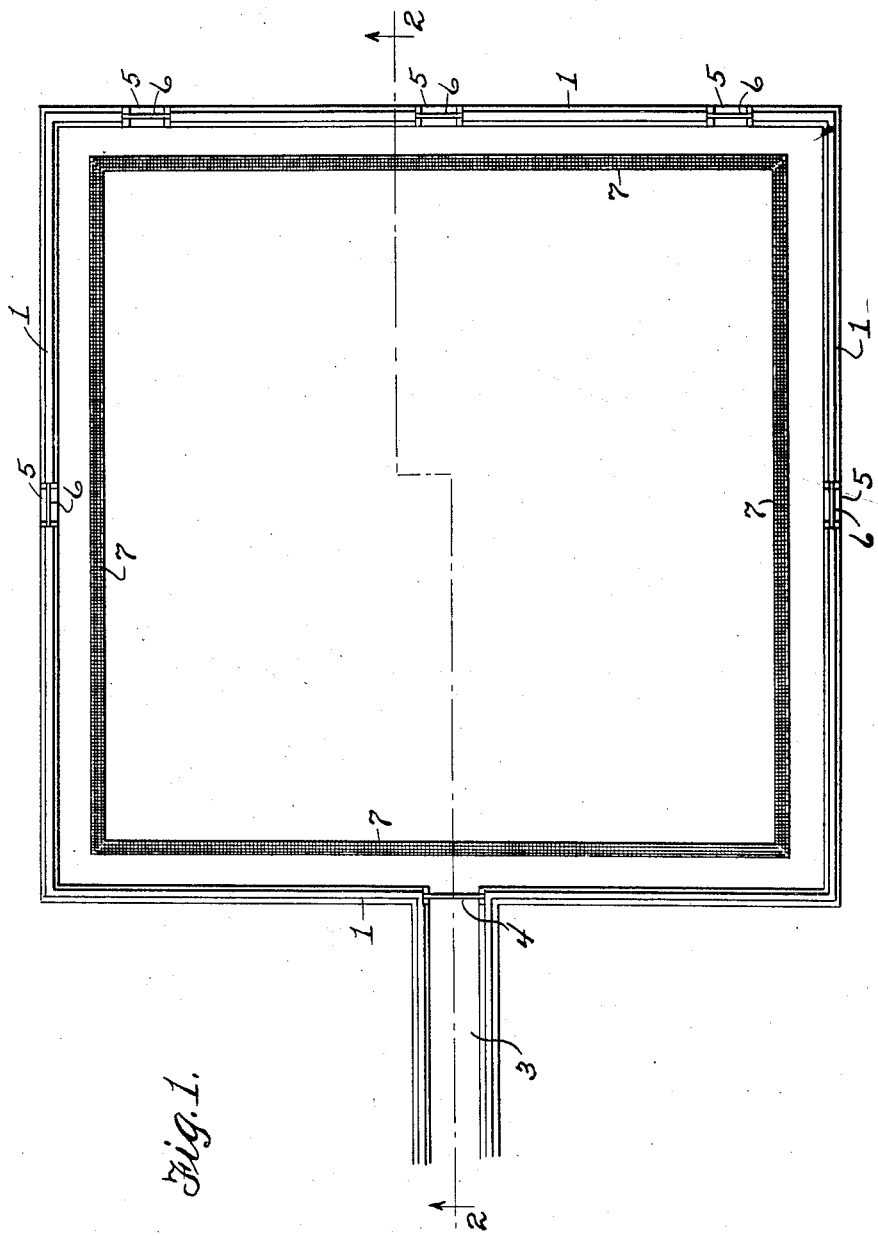

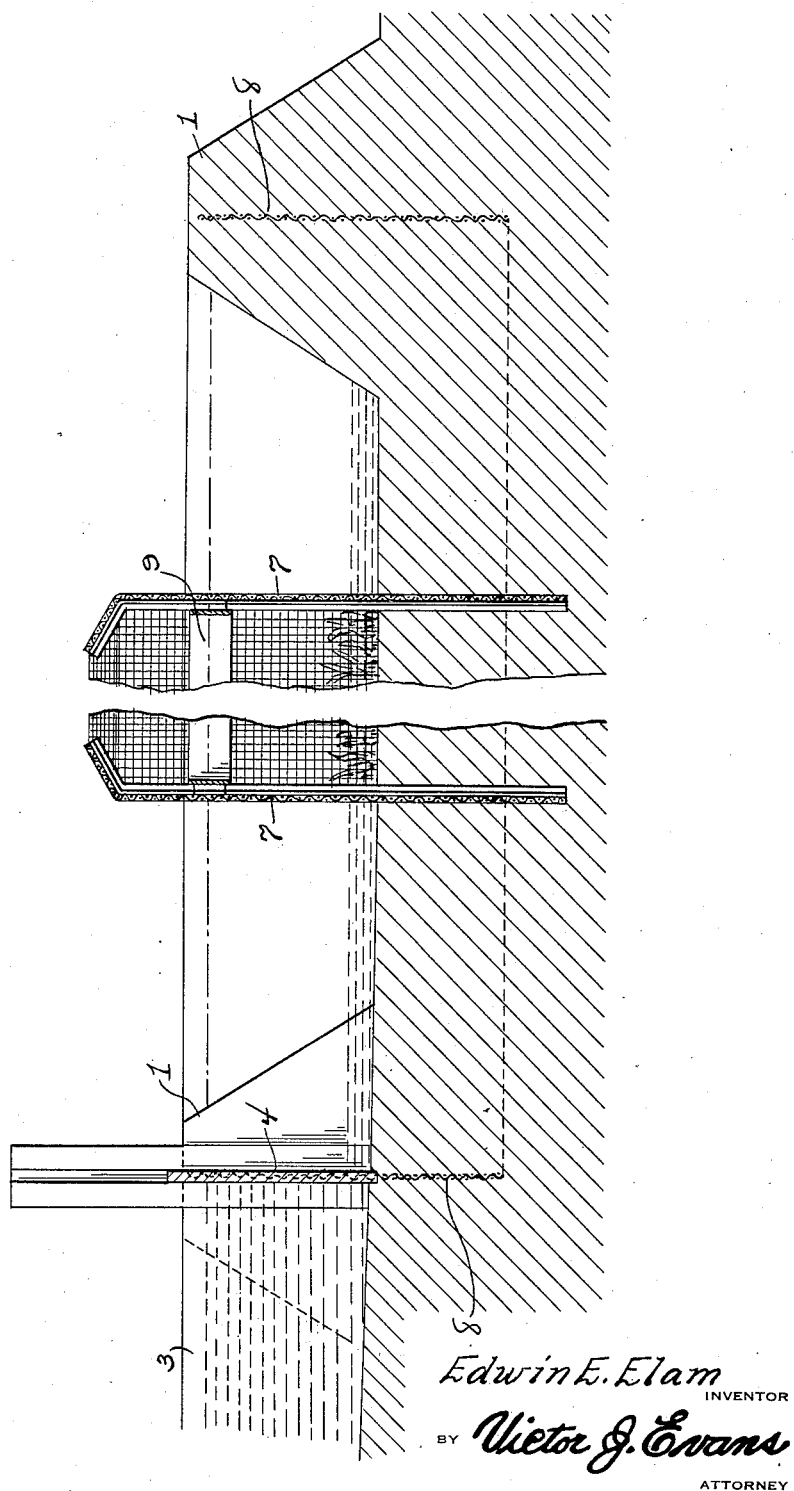

Patented Oct. 14, 1930

1,778,629

UNITED STATES PATENT OFFICE

EDWIN E. ELAM, OF NEW ORLEANS, LOUISIANA

SYSTEM OF FARMING AND TRAPPING MUSKRATS

Application filed May 22, 1929. Serial No. 365,195.

This invention relates to a system of farming and trapping muskrats and the like, the general object of the invention being to employ the regulation of water surface in the raising and trapping of the animals. The means for accomplishing the above objects consist in the combination of a suitable dike enclosed plot of land, with means whereby the plot can be covered with water to promote the growth of aquatic plants, the animals' food, with means for regulating the water level and a fence enclosing the plot above and below the ground level to prevent the animals from escaping therefrom, so that by keeping the water level low, the animals can live and breed under natural conditions and then by raising the water level, the animals can be forced out of the ground or grass to a higher level, thence on to runways, platforms or earth embankments above the water level leading to pens or enclosures or traps placed either within or without the enclosing dikes, or forced into traps set at the flood water surface, or forced to the water surface where the animals can be captured with nets or allowed to drown.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the system.

Figure 2 is a section on line 2—2 of Figure 1.

In these views, the numeral 1 indicates a dike or levee enclosing a plot of ground, water being introduced on to the plot through the inlet 3 by any suitable means, the inlet being controlled by a gate 4 and outlets 5 are arranged in certain parts of the dike or levee for regulating the water level, these outlets also being controlled by gates 6. A fence 7, preferably of woven wire, encloses the plot, the fence being placed inwardly from the dike, as shown, and a core 8, also of woven wire, extends through the center of the dike and a considerable distance into the ground so as to make the dike impervious to earth boring animals. A strip 9 of metal or the like is placed around the inner face of the fence at the high water level, to prevent the animals from clinging to the wire netting when forced out of the ground or grass by the raise in water level. Thus it will be seen that by keeping the water level at a low point, the animals can live and breed under natural conditions, the water causing the proper growth of food grasses and the like. The fence not only keeps the animals from escaping or destroying the dike, but it also protects them from other animals. When the animals are to be trapped, the water level is raised, so that the animals will be drowned outright or they can be caught by nets or the like as they swim on the surface of the water, or small enclosures can be provided on the outside of the plot into which the high water will force the animals so that they can be easily caught.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A system of farming fur bearing animals, comprising a dike surrounding a plot of land, means for introducing water into the space enclosed by the dike, a fence enclosing the plot and slightly spaced inwardly from the dike whereby the animals are prevented from reaching the dike and means for regulating the level of water whereby by keeping the level low, the animals can live and breed under natural conditions and vegetation can grow in the plot and by raising the level, the animals can be caught.

2. A system of farming fur bearing animals, comprising a dike surrounding a plot of land, means for introducing water into the space enclosed by the dike, a fence enclosing the plot and placed inwardly from the dike, means for regulating the level of water whereby by keeping the level low, the animals can live and breed under natural conditions and by raising the level, the animals can be caught and a strip fastened to the inner face of the fence at the high water level to prevent the animals from clinging to the wire netting when forced out of the ground or grass by the raise in water level.

In testimony whereof I affix my signature.

EDWIN E. ELAM.